(12) United States Patent
Braun et al.

(10) Patent No.: US 6,462,823 B1
(45) Date of Patent: Oct. 8, 2002

(54) WAVELENGTH METER ADAPTED FOR AVERAGING MULTIPLE MEASUREMENTS

(75) Inventors: David M. Braun, Santa Rosa, CA (US); Benjamin S. Wheeler, Santa Rosa, CA (US); Rance M. Fortenberry, Santa Rosa, CA (US); Gregory S. Hill, Santa Rosa, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 47 days.

(21) Appl. No.: 09/835,269

(22) Filed: Apr. 13, 2001

(51) Int. Cl.[7] ................................................ G01B 9/02
(52) U.S. Cl. ...................................... 356/452; 356/451
(58) Field of Search ............................... 356/496, 497, 356/498, 499, 500, 401, 452, 455

(56) References Cited

U.S. PATENT DOCUMENTS

| | | | |
|---|---|---|---|
| 5,166,749 A | * 11/1992 | Curbelo et al. | 356/452 |
| 5,523,838 A | * 6/1996 | Nagashima | 356/452 |
| 5,576,834 A | * 11/1996 | Hamada | 356/452 |
| 5,943,134 A | * 8/1999 | Yamaguchi et al. | 356/497 |

* cited by examiner

Primary Examiner—Drew A. Dunn

(57) ABSTRACT

A wavelength meter for measuring the wavelength of an input light signal. The meter includes a beam splitter, a fixed mirror, and a moveable mirror, the beam splitter splits the input signal into a first input signal and a second input signal, the first and second input signals being reflected from the fixed and moveable mirrors, respectively, and being recombined by the beam splitter. The first reference light signal is reflected by the fixed mirror and the second reference light signal is reflected by the moving mirror, the beam splitter recombines the first and second reference light signals to form a combined reference light signal. The amplitude of the combined reference light signal is detected by a reference detector that generates a reference signal related to the amplitude of the combined reference light signal. The wavelength meter also includes a position circuit for generating a start signal indicating that the moveable mirror is at a first position relative to the fixed mirror and that the moveable mirror is moving in a first direction. A controller records a sequence of measurement signal values in response to the start signal and the reference signal.

7 Claims, 5 Drawing Sheets

WAVELENGTH METER ADAPTED FOR AVERAGING MULTIPLE MEASUREMENTS

FIELD OF THE INVENTION

The present invention relates to optical spectrometers, and more particularly, to wavelength meters based on Michelson Interferometers.

BACKGROUND OF THE INVENTION

An optical wavelength meter is an electronic instrument that measures the wavelength of a light signal input thereto. An optical multi-wavelength meter is one that can simultaneously measure the wavelengths of multiple signals of light such as channels in a wavelength division multiplexing (WDM) system.

Wavelength meters based on Michelson interferometers are well known in the optical arts. Michelson interferometer based wavelength meters operate by measuring an interference signal between two light beams generated from the optical signal being measured. One light beam traverses a fixed path while the other traverses a path that is varied by moving the position of a mirror that is part of that path. The interference signal varies in amplitude as a function of the mirror position. In this type of wavelength mirror, the amplitude of the interference signal is measured as a function of the mirror position at a number of discrete mirror positions. The resulting signal is then subjected to a fast Fourier transform (FFT) to obtain the amplitude of the input optical signal as a function of wavelength. The measurement points are typically defined by a second interference pattern that is generated from a light signal of known wavelength that is reflected from the same mirror.

A common measurement for evaluating a WDM system consists of measuring the noise level centered between channels in a WDM system. The noise measured between channels is a combination of noise generated by the WDM system and noise generated by the instrument. Hence, measurement of the interchannel noise requires that the instrument noise be small compared to the noise in the system under measurement.

One method for minimizing the effects of instrument noise is to take multiple traces and average the results. Each trace requires a FFT. Hence, the multiple traces can impose a severe computational load on the instrument.

In principle, multiple traces can be averaged in the time-domain to obtain an averaged trace that is then subjected to a single FFT. However, to average the time-domain traces, each trace must begin and end at the same point in the mirror's travel. Each of the measurement points of each trace must be taken at the same distance from the zero optical path delay position of the second interference pattern discussed above. More specifically, the measurement points must be taken at the same distance away from the zero optical path delay of the input signal. Ideally, the zero optical path delay position for the input signal and for the second interference pattern are either the same point, or offset by a constant amount over the range of temperatures encountered during the measurement process. If the zero optical path delay position does not move, then the measurements can begin at the same mirror position. However, these positions are normally not equivalent because the distances between the fixed and moving mirrors change due to temperature changes. While the calibration standard used to define the measurement points provides very high accuracy in determining the measurement points once a starting reference fringe is selected, this standard is of little use in measuring the absolute position of the mirror at any time.

Broadly, it is the object of the present invention to provide an improved wavelength meter.

It is a further object of the present invention to provide a wavelength meter that can generate multiple traces that are aligned with respect to one another so that the traces can be averaged.

These and other objects of the present invention will become apparent to those skilled in the art from the following detailed description of the invention and the accompanying drawings.

SUMMARY OF THE INVENTION

The present invention is a wavelength meter for measuring the wavelength of an input light signal. The meter includes a beam splitter, a fixed mirror, and a moveable mirror, the beam splitter splits the input signal into a first input signal and a second input signal, the first and second input signals being reflected from the fixed and moveable mirrors, respectively, and being recombined by the beam splitter. A measurement detector generates a measurement signal related to the amplitude of the recombined input signal. The meter also includes a reference light source for generating a reference light signal that is split by the beam splitter into first and second reference light signals. The first reference light signal is reflected by the fixed mirror and the second reference light signal is reflected by the moving mirror, the beam splitter recombining the first and second reference light signals to form a combined reference light signal. The amplitude of the combined reference light signal is detected by a reference detector that generates a reference signal related to the amplitude of the combined reference light signal. The wavelength meter also includes a position circuit for generating a start signal indicating that the moveable mirror is at a first position relative to the fixed mirror and that the moveable mirror is moving in a first direction. A controller records a sequence of measurement signal values in response to the start signal and the reference signal. A plurality of such sequences can be averaged together prior to performing a Fourier transform to determine the optical spectrum of the input light signal.

DETAILED DESCRIPTION OF THE INVENTION

Figure 1:
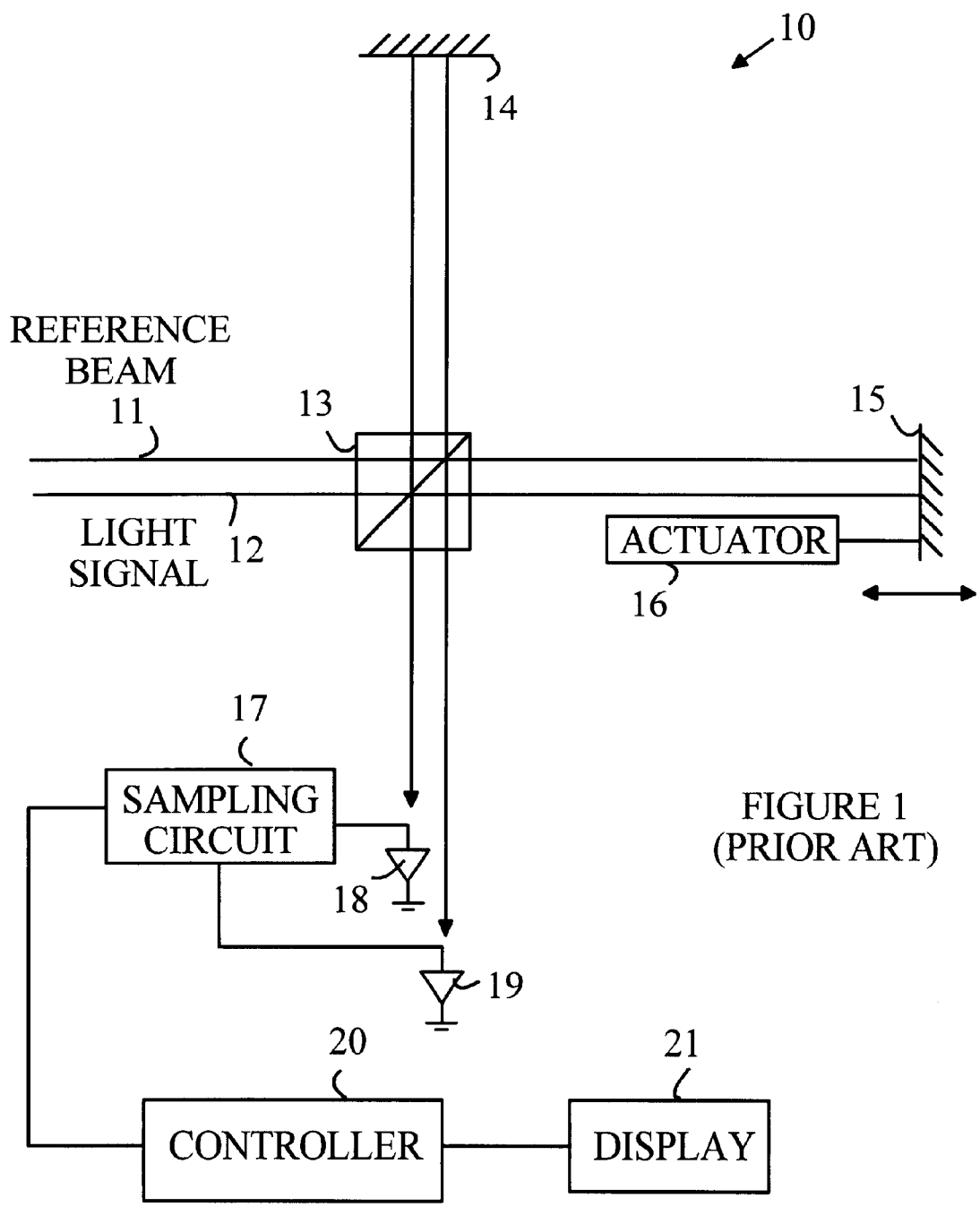
FIG. 1 is a block diagram of a prior art wavelength meter 10 that utilizes a Michelson interferometer

The manner in which the present invention provides its advantages can be more easily understood with reference to FIG. 1, which is a block diagram of a prior art wavelength meter 10 that utilizes a Michelson interferometer. A light signal 12 to be analyzed is input to a beam splitter 13 that splits the light signal into a first beam that is reflected from a fixed mirror 14 and a second beam that is reflected from a moveable mirror 15. The first and second beams are recombined at beam splitter 13 where the beams interfere to generate a light signal that is applied to photodiode 19. If the input light signal consists of a single wavelength, the light signal detected by photodiode 19 will vary sinusoidally provided actuator 16 moves mirror 15 at a constant speed.

As noted above, this signal is sampled by a sampling circuit 17. The points at which the signal is sampled are determined by a second signal that is generated from a reference beam 11, which is typically generated by a highly accurate source such as a He—Ne laser. The reference beam is split into two light beams by beam splitter 13. These beams are reflected from the fixed and moveable mirrors, respectively, and recombined by beam splitter 13. The resulting combined beam is applied to photodetector 18 whose output is a sinusoidally varying reference signal that goes through one cycle each time mirror 15 moves a distance equal to half the wavelength of the reference beam. Sampling circuit 17 uses a fixed point on this reference signal to trigger the sampling of the signal from detector 19. For example, the maximum of each cycle of the sinusoid can be detected and used to trigger a sample.

While the reference signal provides a very accurate indication of the change in position of the mirror, it does not provide any information about the absolute position of the mirror. As noted above, to average the sampled signals from detector 19, the sampled signals must begin at the same point in the mirror's travel on successive sweeps of the mirror. In principle, the mirror actuator can include an encoder that provides a signal that allows the absolute position of the actuator mechanism, and hence, the position of the mirror to be determined. Unfortunately, the actuators have sufficient backlash that such an encoder cannot provide the absolute position of the mirror to the required accuracy, which is a fraction of the wavelength of the reference beam.

Figure 2:
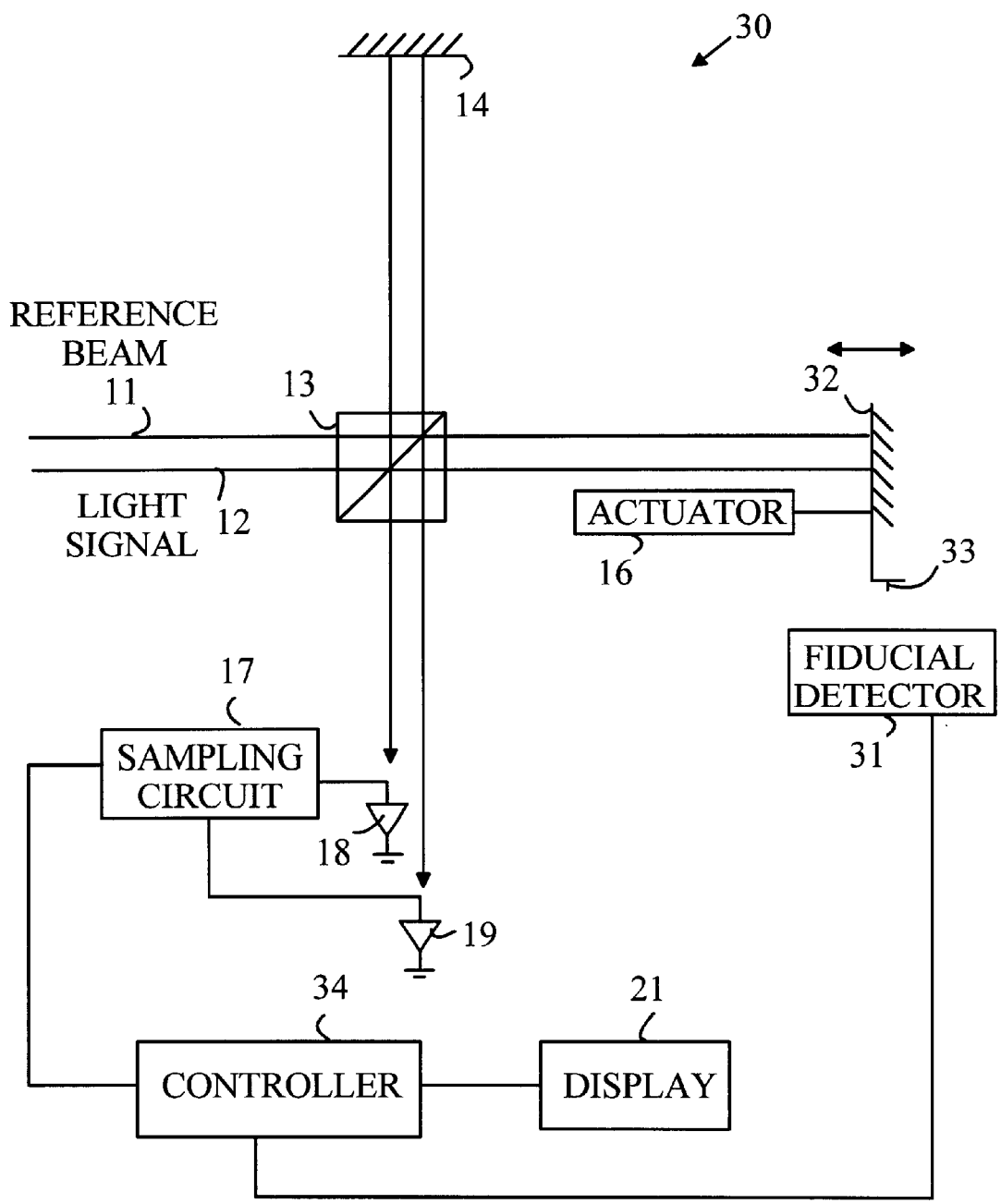
FIG. 2 is a block diagram of a first embodiment of a wavelength meter according to the present invention.

The present invention overcomes this problem by providing a position detector for determining when the mirror passes a fixed point in its travel going in a predetermined direction. Each time the mirror passes this position, the controller begins a new sequence of measurements. The resulting sequences can then be averaged together prior to performing an FFT on the averaged sequence. Refer now to FIG. 2, which is a block diagram of a first embodiment of a wavelength meter 30 according to the present invention. To simplify the following discussion, those elements of wavelength meters according to the present invention that serve the same function as elements shown in wavelength meter 10 have been given the same numeric designations. Wavelength meter 30 utilizes a fiducial detector 31 to detect a fiducial mark 33 on the stage that carries mirror 32. The fiducial mark may be attached to any structure that moves rigidly with mirror 32. The fiducial detection system must have a reproducibility of preferably 0.10 microns or less. The positioning systems utilized in semiconductor fabrication can provide resolutions of this accuracy. Since such systems are known to those skilled in the arts, they will not be discussed in detail here.

Figure 3:
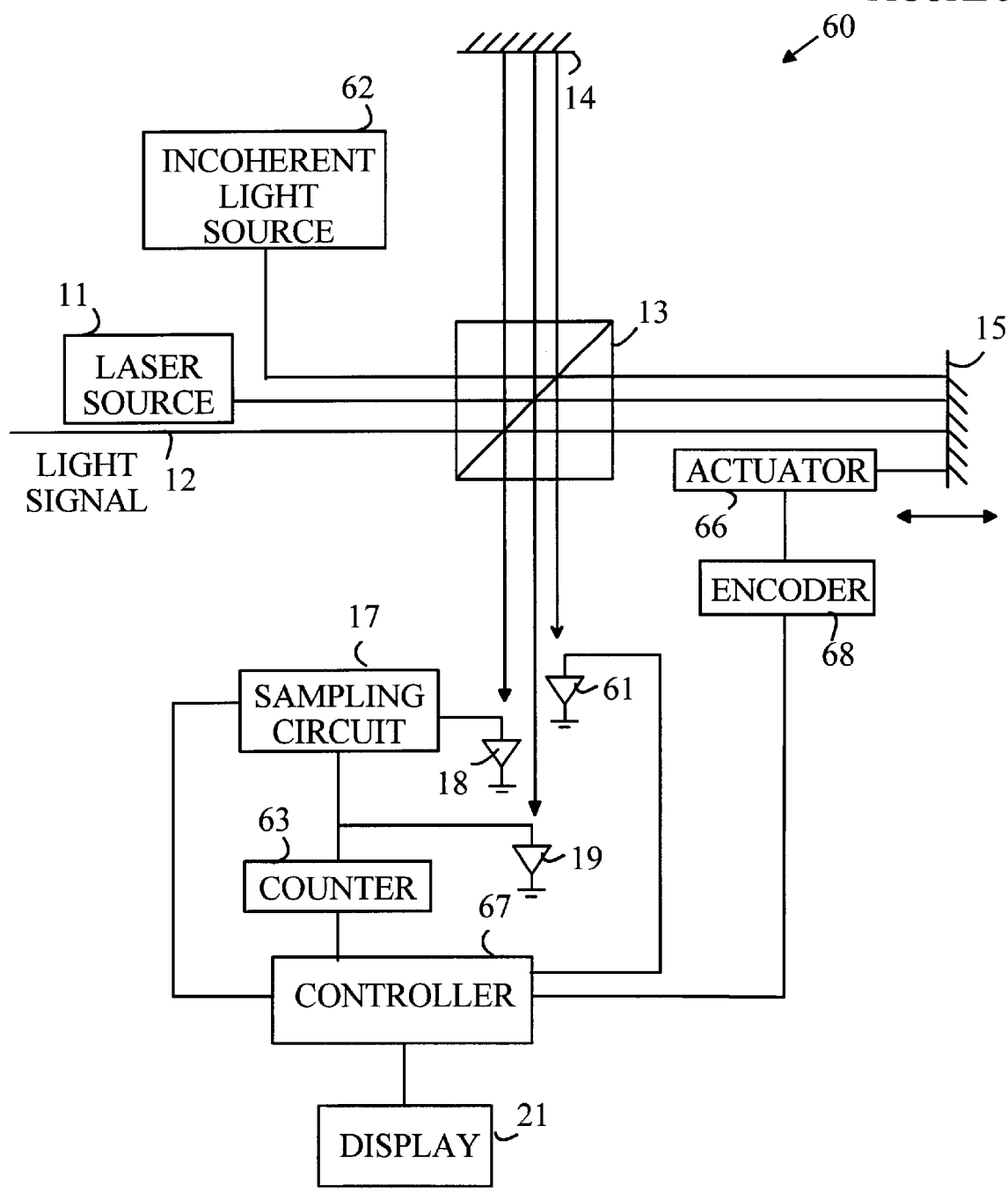
FIG. 3 is a block diagram of a second embodiment of a wavelength meter according to the present invention.

Refer now to FIG. 3, which is a block diagram of a second embodiment of a wavelength meter according to the present invention. Wavelength meter 60 utilizes a second calibration source 62 to define a reproducible position along the mirror's path. Calibration source 62 is an incoherent source, which generates a light signal that is also split into two beams by beam splitter 13. One beam is reflected by mirror 14, and the other is reflected by mirror 15. The reflected beams are recombined by beam splitter 13 and directed to a photodiode 61. Since the two beams are incoherent, the beams will only constructively interfere when the optical path from beam splitter 13 to mirror 15 is equal to that from beam splitter 13 to mirror 14. This peak output from photodiode 61 will occur when these paths are the same. Hence, this output defines a known position on the path of mirror 15 that can be used to define the starting position of a sweep. Since mirror 15 passes through this position twice, once while traveling in each direction, the direction of the mirror's travel must also be known. If this point is displaced significantly from the points at which the mirrors direction of travel is reversed, a simple low resolution encoder 68 on actuator 66 may be used to define the sweep on which measurements are taken.

In some embodiments of the present invention, it may be advantageous to define the sweep starting point by a predetermined displacement from a known point on the mirror's path. A counter 63 that is under the control of controller 67 can be used to define an offset by counting fringes from the calibration signal generated by photodiode 19.

It should be noted that an absolute position for the mirror travel is not required, provided each sweep in the sequence of measurements that is to be averaged begins and ends at the same point. Counter 63 may be used to define such a point, provided the direction of travel of the mirror may be ascertained at all times during the measurement process. In this embodiment of the present invention, counter 63 is loaded with a known value at the beginning of the first sweep. When the mirror is traveling in one direction, the counter is incremented each time the output of photodetector 19 passes through a defined state such as the maximum of the sinusoidal signal generated by the sequence of fringes. When the mirror is traveling in the opposite direction, the counter is decremented each time the output of photodetector 19 passes through the defined state. When the counter returns to the starting value and the mirror is travelling in the correct direction, the next sweep can be measured.

In principle, an encoder in the actuator can be used to determine the direction of movement of the mirror; however, the resolution of the encoder must be preferably 0.10 $\mu$m or less. Such encoding schemes are possible; however, they are near the practical limit of encoders that are currently available.

Figure 4:
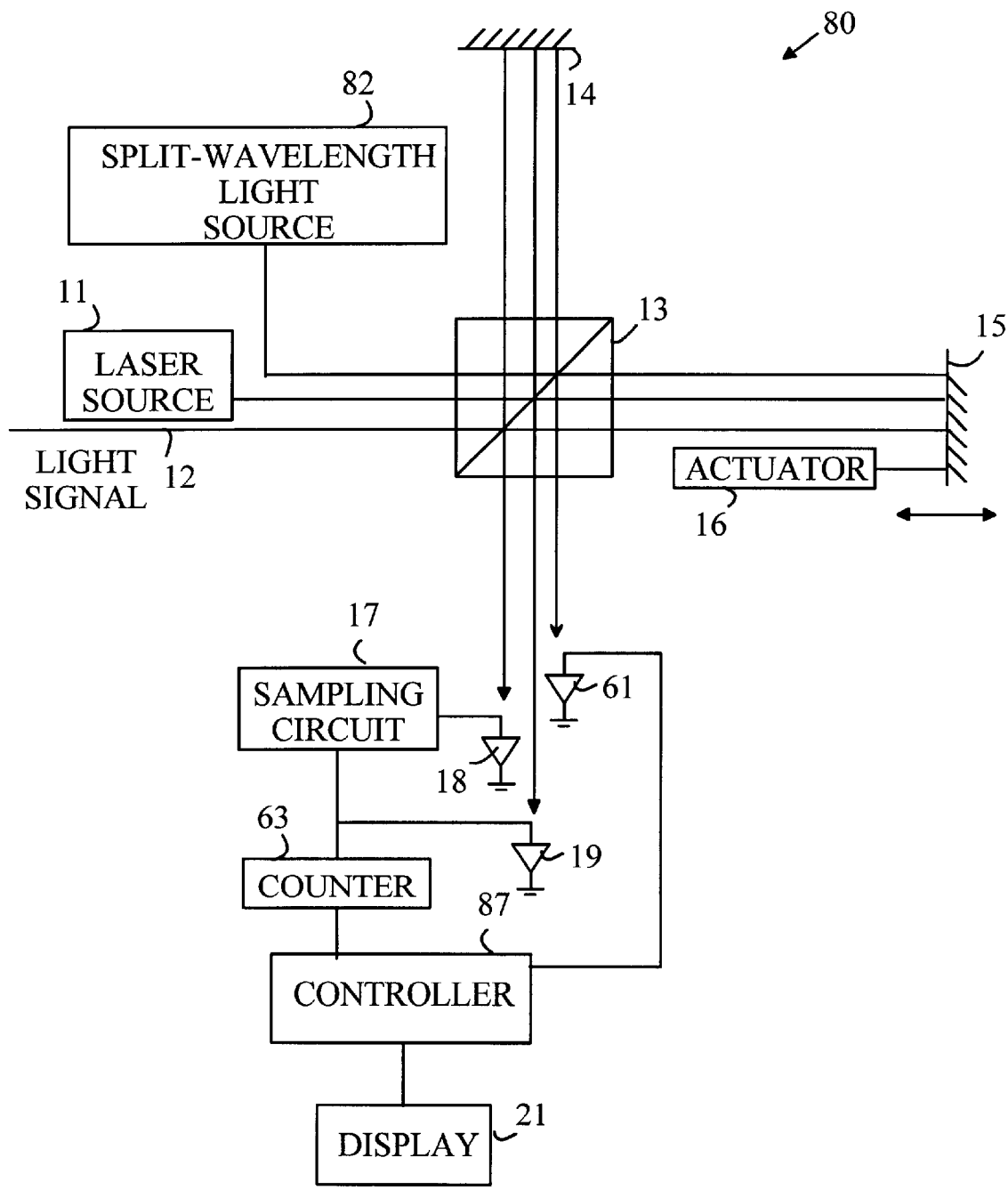
FIG. 4 is a block diagram of a wavelength meter according to the present invention that utilizes a dual wavelength source 82 for determining the direction of travel of the mirror.

A second method for determining the direction of travel of the mirror utilizes a technique that is employed in linear interferometers that are used to measure the position of an end mill and states the direction of travel very accurately. Refer now to FIG. 4, which is a block diagram of a wavelength meter according to the present invention that utilizes a dual wavelength source 82 for determining the direction of travel of the mirror. Source 82 utilizes a HeNe laser that generates two frequencies separated by 2 MHz. The output of this source is divided into two beams, one being reflected by mirror 14 and the other being reflected by mirror 15. The reflected beams are recombined by beam splitter 13. The interference between the beams generates a constant 2 MHz beat signal from photodetector 61 when mirror 15 is stationary. When mirror 15 moves, the beat frequency is Doppler shifted up or down, depending on the direction of motion of the mirror. In this embodiment of the present invention, laser source 11 can be eliminated and the output of photodiode 61 used as the trigger for sampling circuit 17.

Figure 5:
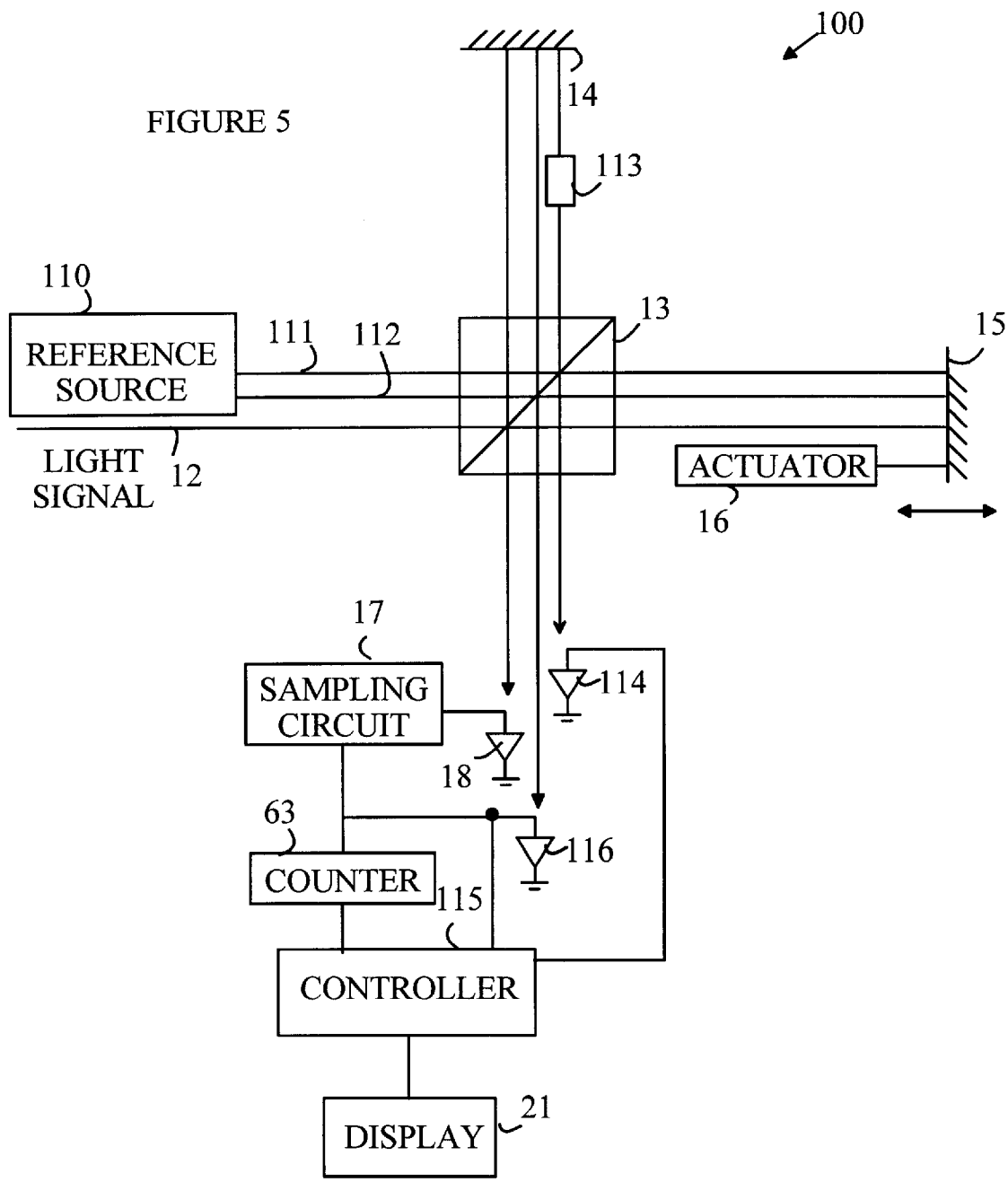
FIG. 5 is a block diagram of a wavelength meter according to the present invention that utilizes another method for determining the direction of travel of the mirror.

Refer now to FIG. 5, which is a block diagram of a wavelength meter according to the present invention that utilizes another method for determining the direction of travel of the mirror. Wavelength meter 100 is similar to wavelength meter 80 in that counter 63 is incremented or decremented on each fringe of a reference fringe pattern depending on the direction of travel of the mirror. Wavelength meter 100 utilizes a reference source that generates two light beams 111 and 112 of the same frequency and phase that are displaced from one another. Such a light source can be generated from a laser and a walk-off crystal. Light beam 111 provides the reference fringe pattern that is counted by counter 63. The optical path traversed by reference beam 112 is setup to be slightly longer than that traversed by reference beam 111. This can be accomplished by inserting an optical delay 113 consisting of a piece of transparent material having an index of refraction greater than air and a length sufficient to retard reference beam 111 by one quarter of a wavelength relative to reference beam 111. Reference beam 113 is detected by a photodiode 114.

The two reference signals will be out of phase by 90 degrees, and one of the signals will lead the other. When the mirror changes direction the leading and lagging signals will be reversed. Controller 115 examines the slope of the signal from photodiode 114 when the signal from photodiode 116 passes through some known position, e.g. its maximum. In one direction of travel, the slope of the signal from photodiode 114 will be positive, and in the other direction of travel, the slope will be negative.

The above-described embodiment of the present invention utilized reference signals that traverse optical paths that differ by a quarter of a wavelength. However, it will be obvious to those skilled in the art from the preceding discussion that the present invention can utilize paths that differ by other values, provided the difference is not an integer multiple of the reference wavelength.

Various modifications to the present invention will become apparent to those skilled in the art from the foregoing description and accompanying drawings. Accordingly, the present invention is to be limited solely by the scope of the following claims.

What is claimed is:

1. A wavelength meter for measuring the wavelength of an input light signal, said meter comprising:

a beam splitter for splitting said input signal into a first input signal and a second input signal;

a fixed mirror for reflecting said first input signal;

a moveable mirror for reflecting said second input signal, said beam splitter recombining said reflected first and second input signals to form a combined input signal;

a measurement detector for generating a measurement signal related to the amplitude of said combined input signal;

a reference light source having a reference wavelength for generating a first reference light signal that is split by said beam splitter into first and second reference light signals, said first reference light signal being reflected by said fixed mirror and said second reference light signal being reflected by said moving mirror, said beam splitter recombining said first and second reference light signals to form a first combined reference light signal;

a first reference detector for generating a reference signal related to the amplitude of said first combined reference light signal;

a position circuit for generating a start signal indicating that said moveable mirror is at a first position relative to said fixed mirror and that said moveable mirror is moving in a first direction, said first position being determined to a precision that is less than one reference wavelength; and a controller for recording a sequence of measurement signal values in response to said start signal and said first combined reference signal.

2. The wavelength meter of claim 1 wherein said position circuit comprises a counter for counting the number of times said first combined reference signal passes through a predetermined state.

3. The wavelength meter of claim 2 further comprising a direction detector for determining the direction of travel of said moveable mirror, said counter being incremented in one direction of travel and decremented in the other direction of travel.

4. The wavelength meter of claim 3 wherein said position detector comprises a third reference light signal having a wavelength the same as said first reference light signal and a phase that is the same as that of said first reference light signal, said third reference light signal being displaced relative to said first reference light signal, said third reference light signal being split by said beam splitter into fourth and fifth reference light signals said fourth reference light signal being reflected by said fixed mirror and said fifth reference light signal being reflected by said moving mirror, said beam splitter recombining said fourth and fifth reference light signals to form a second combined reference light signal, wherein the optical path length traversed by said first reference light signal is different from that traversed by said fourth reference light signal; and a second reference detector for generating a second reference signal related to the amplitude of said second combined reference light signal, wherein said direction detector compares said first and second reference signals to determine the direction of travel of said moveable mirror.

5. The wavelength meter of claim 1 wherein said position circuit comprises an incoherent light source for generating an incoherent reference light signal, said incoherent reference light signal being split into first and second incoherent reference light signals and being combined by said beam splitter to form a combined incoherent reference light signal after being reflected from said fixed and moveable mirrors, respectively; and a detector for generating an incoherent reference signal related to the intensity of said combined incoherent reference light signal.

6. The wavelength meter of claim 1 wherein said position circuit comprises first and second laser signals differing in frequency by a predetermined amount, each of said laser signals signal being split by said beam splitter and recombined to form a combined laser reference light signal after being reflected from said fixed and moveable mirrors;

a detector for generating a laser reference signal related to the intensity of said combined laser reference light signal; and a direction circuit for measuring the Doppler shift of said laser reference signal when said moveable mirror is moving.

7. The wavelength meter of claim 1 wherein said position circuit comprises an encoder on an actuator attached to said moveable mirror, said actuator causing said moveable mirror to move along a predetermined path.

* * * * *